United States Patent [19]

Jones

[11] Patent Number: 4,775,769

[45] Date of Patent: Oct. 4, 1988

[54] METHOD OF BAKING UTILIZING RADIO FREQUENCY ENERGY AND METAL CONTAINERS

[75] Inventor: Peter L. Jones, Chester, England

[73] Assignee: The Electricity Council of 30 Millbank, London, England

[21] Appl. No.: 60,557

[22] Filed: Jun. 11, 1987

[30] Foreign Application Priority Data

Jun. 11, 1986 [GB] United Kingdom ................. 8614236

[51] Int. Cl.⁴ .............................................. H05B 6/54
[52] U.S. Cl. .............................. 219/10.41; 219/10.81; 99/358; 99/DIG. 14; 426/243
[58] Field of Search ............... 219/10.81, 10.41, 10.69; 99/451, DIG. 14, 358; 426/243, 244, 245, 246, 247, 523

[56] References Cited

U.S. PATENT DOCUMENTS

| 2,103,469 | 12/1937 | Kremer | 99/358 |
| 2,413,003 | 12/1946 | Sherman | 219/10.81 |
| 2,491,687 | 12/1949 | Nutt | 219/10.81 X |
| 2,942,562 | 6/1960 | Luc | 426/244 X |
| 3,082,710 | 3/1963 | Holland | 219/10.81 X |
| 4,303,820 | 12/1981 | Stottmann et al. | 219/10.81 |

FOREIGN PATENT DOCUMENTS 904371 8/1962 United Kingdom ................. 99/358

Primary Examiner—Philip H. Leung
Attorney, Agent, or Firm—Beveridge, DeGrandi & Weilacher

[57] ABSTRACT

In a method of baking using an open face container a radio frequency field is applied between the container and the material to be baked therein in order to enhance the heating of the material and thus shorten the baking time. The method can be used in a conventional oven of, for example, the convection type.

4 Claims, 1 Drawing Sheet

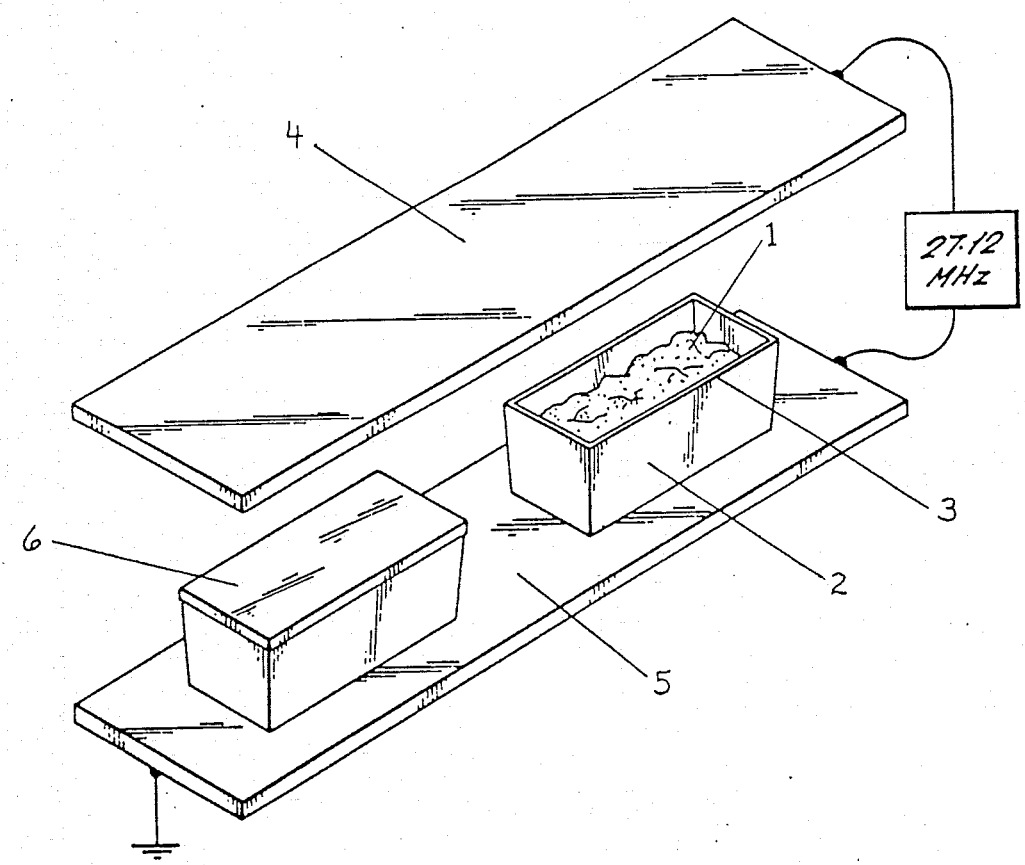

METHOD OF BAKING UTILIZING RADIO FREQUENCY ENERGY AND METAL CONTAINERS

This invention relates to a method of baking.

To have market appeal bread must have its traditional brown crust, and thus any method and apparatus used for baking bread must be such as to provide such a brown crust. In particular, the container used to contain the basic dough during baking must have heat transfer properties which permit the formation of an acceptable brown crust.

In the United Kingdom bread is generally produced as 1 lb. or 2 lb. rectangular loaves each produced in an individual container, called a tin, made of mild steel, from which the loaf is removed only at the end of baking.

The use of microwave energy for cooking is now common, but, as will be appreciated, cannot be used in conjunction with conventional bread baking methods in view of the mild steel tins used to contain the basic dough for baking. If microwave energy is to be used then it will be necessary to provide a container for the basic dough, which is able to withstand the baking temperatures, ie. 250° C., transparent to microwaves, and cheap, and no such container has yet been found.

It is known to use radio frequency energy in the cooking of, for example, biscuits and breakfast cereals, which are self supporting items and which can thus be carried through the radio frequency energy heating means on non-metal conveyor belts. However, radio frequency energy has not been considered suitable for use in baking in view of the shielding effect of the metal tins used, and the high probability of electrical discharges occurring.

The FIGURE is a perspective view of an apparatus in accordance with an embodiment of the present invention.

According to this invention there is provided a method of baking in which material 1 to be baked is baked in a metal container 2 having an open face 3, including the steps of locating the container with the material therein between a high voltage electrode 4 and a grounded electrode 5, and providing a radio frequency electric field between said electrodes, the open face of the container being directed towards the high voltage electrode and the container being connected to the grounded electrode.

Preferably the radio frequency field has a frequency of 27.12 MHz and a power density of the order of 6 kW/m$^2$.

With the method of this invention the radio frequency field is nominally normal to the open face of the container containing the material to be baked. The field will be distorted by the metal of the container, but since at radio frequency the major contributor to heating is the ionic conductivity of the material to be baked, and since such materials, eg. bread doughs or the like, are wet and contain salt and thus have a high ionic conductivity, the distortion of the field is much less than would be the case with an empty container.

If a flat topped baked product is required then the container can be closed by means of a non-metalic lid 6 of, for example, a reinforced polymer material capable of withstanding baking temperatures (220°–250°), to contain the material to be baked. A metallic lid cannot be used since this would shield the material to be baked from the radio frequency field.

The steps of the method of this invention can be used during the whole or only part of a conventional baking process, the air temperatures obtained being between 220° C. and 250° C. with an inherent additional radiant component provided by the surface temperatures of the electrodes and heater assemblies used.

Because of the metal containers used, a field pattern develops which sets a ratio of height to plan area for the containers that cannot be exceeded. However, standard baking tins are below this limit.

The high voltage electrode can be a simple perforated plate through which air passes to provide convection in the baking apparatus, the plate possibly constituting a nozzle array as found in conventional convection ovens.

Containers can be processed individually, or otherwise a plurality of containers can be secured together and to the grounded electrode which can be a conveyor belt in the case of a travelling oven.

What is claimed is:

1. A method of baking a product by radio frequency heating, comprising:
   placing the product to be baked in a metal container having a metal base with metal walls extending from said base and leaving an open top face;
   locating said metal container with the product therein between a high voltage electrode and a grounded electrode;
   directing said open top face of said metal container toward said high voltage electrode;
   electrically connecting said metal container to said grounded electrode; and
   generating a radio frequency electric field between said electrodes.

2. A method of baking as claimed in claim 1 wherein said radio frequency generating step comprises generating a radio frequency field having a power density in the order of approximately 6 kw/m2.

3. A method of baking as claimed in claim 1 wherein said radio frequency generating step comprises generating a radio frequency field having a frequency of 27.12 MHz.

4. A method of baking as claimed in claim 1 further comprising:
   covering said metal container with a non-metallic lid prior to baking the product.

* * * * *